United States Patent [19]

Edwards

[11] Patent Number: 4,526,919
[45] Date of Patent: Jul. 2, 1985

[54] POLYOLEFIN EXTRUSION COATING COMPOSITIONS HAVING GOOD COATABILITY AND GOOD ADHESION TO THE SUBSTRATE

[75] Inventor: Ray Edwards, Henderson, Tex.

[73] Assignee: Eastman Kodak Company, Rochester, N.Y.

[21] Appl. No.: 625,332

[22] Filed: Jun. 27, 1984

[51] Int. Cl.$^3$ ............ C08K 5/20; C08L 23/06; C08L 23/10; C08L 93/04
[52] U.S. Cl. ................... 524/232; 524/271; 524/515
[58] Field of Search ........... 524/232, 271, 274, 515

[56] References Cited
U.S. PATENT DOCUMENTS 3,176,021  3/1965  Volangis et al. ............ 524/232
3,330,796  7/1967  Mock et al. ................ 524/232
4,394,474  7/1983  McKinney et al. ........... 524/232

Primary Examiner—Allan M. Lieberman
Attorney, Agent, or Firm—Clyde L. Tootle; Daniel B. Reece, III

[57] ABSTRACT

This invention relates to novel blends containing crystalline polypropylene or propylene containing copolymer, low density polyethylene, hydrocarbon tackifying resin, and a fatty acid amide useful as extrusion coating compositions which provide coatings having good coatability and good heat sealability. These coated substrates then can be used in fabricating bags and other packaging applications. These extrusion coating compositions are a blend of a crystalline polypropylene, or propylene containing copolymer, low density polyethylene, hydrocarbon tackifying resin, and a fatty acid amide containing 16 to 40 carbon atoms.

21 Claims, No Drawings

POLYOLEFIN EXTRUSION COATING COMPOSITIONS HAVING GOOD COATABILITY AND GOOD ADHESION TO THE SUBSTRATE

DESCRIPTION

This invention relates to novel polyolefin containing blends which provide extrusion coatings having both good coatability and good adhesion to the substrate. One aspect of this invention relates to an extrusion coating blend containing: (1) a crystalline polypropylene or propylene/alpha-olefin copolymer containing at least 80 weight percent polymerized propylene, (2) a low density polyethylene, (3) a tackifying resin, and (4) a fatty acid amide. These blends provide extrusion coating compositions having both good coatability and good adhesion to the substrate, substantially no pinholes and good heat seal strength.

Extruding a coating of a polyolefin or blends of polyolefins onto a substrate, such as paper or aluminum foil, to form an extrusion coated substrate is well known in the art. Various polyethylenes and blends of polyethylenes and other polyolefins have been widely used as extrusion coating compositions. However, a polyolefin such as crystalline polypropylene alone, regardless of its molecular weight (flow rate), is not a satisfactory extrusion coating material since it does not have high speed coating ability or a wide range of coating weights. Therefore, many of its excellent physical properties cannot be utilized in extrusion coating applications. Therefore, in order to improve the coating properties of polypropylene, blends of polyethylene and polypropylene have been used as extrusion coating compositions. For example, U.S. Pat. No. 3,418,396 describes and claims such blends of polypropylene and polyethylene having excellent extrusion coating properties. Although the blends disclosed in U.S. Pat. No. 3,418,396 are useful in many applications, they have the disadvantage that such blends when applied as coatings to substrates, such as paper, do not provide the necessary adhesion of the coating to the substrate for preparing certain packaging materials.

Extrusion coating compositions containing polypropylene, polyethylene, and a tackifier resin are disclosed in U.S. Pat. No. 3,652,725. These blends provide coatings having excellent adhesion to the substrate and good pinhole properties at extrusion coating temperatures of about 283° C. At this coating temperature good adhesion is obtained whereas blends without the tackifier had poor adhesion. However, these blends with tackifier had coating speeds or coatability of only about 122 m./min. or less. Therefore, it would be an advance in the state of the art to provide an extrusion coating composition that could be applied at coating speeds greater than 122 m./min. to substrates to provide coatings having good adhesion to the substrate.

In accordance with this invention, polyolefin extrusion coating compositions are provided which provide coatings having good coatability and provide a coating having good adhesion to the substrate. Such compositions are a blend of: (1) at least one crystalline polypropylene or propylene containing copolymer containing at least 80 weight percent propylene, (2) low density polyethylene, (3) tackifying resin, and (4) fatty acid amide. These extrusion coating compositions provide an extrusion coating composition having a melt flow rate of 40 to 100 that can be coated at coating speeds of greater than 122 m./min. to provide coatings of less than 1 mil thickness and have good adhesion to the substrate and good heat seal strength. These unique blend compositions with which this invention is concerned are as follows:

| Component | Weight Percent Contained in Composition | |
|---|---|---|
| | Broad Range | Preferred Range |
| Propylene Homo- or Copolymer | 90–65% | 80–90% |
| Low Density Polyethylene | 5–20% | 5–10% |
| Tackifier Resin | 0.5–12.5% | 2–10% |
| Fatty Acid Amide | 0.2–1.0% | 0.3–0.5% |

These blends provide excellent coatings on substrates, such as paper stock or primed aluminum foil which can be used for preparing food packages. Such uses require the coating to have good adhesion to the substrate especially in fabricating food packages where handling or flexibility is encountered.

The crystalline polypropylene or propylene copolymer has a melt flow rate of about 30 to 140 dg/m at 230° C. and is prepared with stereospecific catalyst by processes well known to the art. The crystalline polypropylene preferably has a melt flow rate of 50 to 70, most preferably a melt flow rate of about 55 to 65. Such crystalline propylene containing polymers can be, for example, commercially available crystalline polypropylene, the crystalline polypropylene prepared according to U.S. Pat. No. 3,679,775, or crystalline propylene containing copolymers prepared according to U.S. Pat. No. 3,529,037. Particularly useful are crystalline polypropylenes and crystalline ethylene/propylene copolymers containing less than 5 weight percent ethylene. The melt flow rate can be determined by test methods known in the art such, for example, as ASTM D-1238.

The low density polyethylene component has a melt index at 190° C. of 2 to 7, preferably about 3.5, a density of above about 0.916 to 0.925 and a swell ratio of about 1.5 to 2.2, preferably 1.9 to 2.1, most preferred about 2. Such polyethylenes useful in this invention are known in the art and can be prepared by methods known to the art.

The melt index, density and swell ratio can also be determined by methods known in the art. For example, melt index can be determined by ASTM Procedure D-1238, density by ASTM D-1505 and the swell ratio is defined as the increase in the diameter of the extrudate over that of the orifice of the extrusion plastometer in ASTM Designation D-1238. The diameter of the specimen is measured in the area between 1/16 inch and ⅜ inch of the initial portion of the specimen as it emerges from the extrusion plastometer. Measurements are made by standard methods per ASTM Designation D-374.

The tackifying resins useful in the compositions of this invention have Ring and Ball softening points of about 75° C. to 150° C. and can be a hydrocarbon resin such as DAC-B hydrocarbon resin prepared according to the process disclosed in U.S. Pat. No. 3,701,760 as well as other hydrocarbon resins, synthetic and natural polyterpenes, resin esters and the like. One such suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a Ring and Ball softening point of from about 75° to 150° C.; an acid number of from about 0 to 2; a saponification value of less than about 1. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful resin esters are the amber colored pentaerythritol ester of rosin having an acid number of about 7 to 16 and a Ring and Ball softening point of about 100° C. to 110° C. One such resin is the pentaerythritol esters of tall oil rosin having a Ring and Ball softening point of 100° C. and an acid number of about 11.

The fatty acid amide is an amide of an aliphatic saturated or unsaturated fatty acid having 16 to 40 carbon atoms such as erucamide, oleamide, stearamide, stearyl erucamide, and the like.

The blends of propylene homo- and copolymers, low density polyethylene, tackifying resin, and fatty acid amide have a flow rate of from about 40 to about 100, preferably 45 to 60, most preferably 45 to 55. Blends having a flow rate of less than 40 do not coat at commercially acceptable speeds due to edge tear and surging. Blends having a flow rate greater than 100 also do not coat at commercially acceptable speeds due to streaking and excessive neck-in.

The blends containing crystalline polypropylene can preferably contain 5 percent to 10 percent polyethylene and 2 percent to 10 percent tackifying resin. Such polypropylene blends which contain more than 12.5 percent tackifying resin have reduced coating speed. On the other hand, blends of propylene/ethylene copolymer and polyethylene preferably contain 2 percent to 10 percent tackifying resin. Such copolymer blends containing 2 percent to 10 percent tackifying resin have excellent coatability, i.e., greater than 122 m./min. Blends having less than 2 percent tackifying resin have some loss in heat seal strength and adhesion to the substrate.

The compositions of the invention may be prepared in various ways such as dry blending and then passing through a compounding extruder, compounding on a milling roll or in a Banbury mixer or by fusion. Any method whereby the components can be blended together will produce the desired blend. For example, pellets of each polymer are blended mechanically and the blend is fed to an extruder wherein it is fused and extruded.

Additives, stabilizers, fillers and the like can be added to the compositions of the present invention. Preferably, these coating compositions should have some thermal stabilization due to the coatings being applied at elevated temperatures. Such materials can be present in the components forming the polymer blend, or may be added when the polymers are blended to form the extrusion coating composition.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

An extrusion coating composition having a melt flow rate of about 40 at 230° C. (ASTM D-1238) was prepared by blending 75 percent by weight of a crystalline polypropylene having a 40 melt flow rate at 230° C. (ASTM D-1238), 14.8 percent by weight of polyethylene having a melt index of 3.5 dg/min at 190° C. (ASTM D-1238), density of 0.917 g/cc (ASTM D-1505), and a swell ratio of 1.70, 9.8 percent by weight tackifier resin having a density of 1.028 g./cc. at 21° C., melt viscosity of about 1,000 cp. at 190° C., and ring and ball softening point of 129° C., and 0.4 percent stearyl erucamide. This blend of materials was evaluated as follows: One portion of the blend was fed to a 8.9 cm. Egan extruder having a barrel length to diameter ratio of 24:1. The four zones of the extruder were maintained, from back to front, at 283° C., 293° C., 304° C., and 316° C. A metering type screw having six compression flights, and 12 metering flights were used. Prior to entering the die the melt passed through one screen of 24×24 mesh. The die was an Egan die, center-fed with 1.3 cm. long lands, with an opening of 40.6 cm.×0.5 cm. The temperature of the die was held at 304° C. The extrusion rate was held constant at 73 kg. per hour. The resulting film extrudate was passed through a 13.4 cm. air gap into the nip formed by a rubber-covered pressure roll and a chill roll. At the same time, 18.1 kg. kraft paper stock 40.6 cm. wide was fed into the nip with the pressure roll in contact with the foil. The nip pressure applied was 104.6 kg. per linear 2.5 cm. The chill roll was a 61 cm. diameter mirror finish steel roll, water cooled to maintain a temperature of 16° C. on the roll. The coated paper was taken off the mirror finished chill roll at a point 180° from the nip formed by the pressure roll and chill roll. The chill roll was operated at linear speeds of about 244 m./min. which is an excellent target range for commercial extrusion coatings. At this coating speed of 244 m./min. a coating was applied to 18.1 kg. kraft paper stock to form a coating of about 0.6 mils which had excellent adhesion of about 400 grams per 2.5 cm. to the paper stock. One method for determining the adhesion to the substrate can be determined with a 2.5 cm. wide coated specimen placed on the jaws of an Instron tester and a reading is made of the gram per 2.5 cm. adhesion at a jaw separation speed of 0.025 cm. per minute when there is fiber tear between paper substrate and polymer coating. The coated paper also had a heat seal strength of about 4.54 kg. per linear 2.5 cm. as measured by a tensile tester at a jaw separation rate of 25 cm./minute when sealed at a temperature of 260° C. using a conventional bar sealer. The coated paper also had substantially no pinholes.

Substituting other tackifying resins such as a pentaerythritol ester of tall oil rosin having a Ring and Ball softening point of about 100° C. and an acid number of about 11 for the tackifier resin having a Ring and Ball softening point of 129° C. provided substantially the same result.

Also, substituting a different fatty acid amide such as stearamide or erucamide for the stearyl erucamide provided substantially the same result.

This example shows that the extrusion coating compositions of the present invention can be coated using relatively high coating speeds to provide good coatings having excellent adhesion to the substrate.

EXAMPLE 2

An extrusion coating composition was prepared according to Example 1 except that a crystalline polypropylene having a melt flow rate of 130 was used to provide an extrusion coatable blend having a melt flow rate of about 100. The composition was extrusion coated satisfactorily at a coating speed of 244 m./min. to provide coatings having adhesion of about 400 grams per 2.5 cm. to the substrate. The heat seal strength of this coated paper was 4.54 kg. per linear 2.5 mm.

This example shows that increasing the blend melt flow rate to about 100 provides a useful extrusion coating composition having high coating speeds and good adhesion to the substrate.

EXAMPLE 3

An extrusion coating composition was prepared according to Example 1 except that a crystalline polypropylene having a melt flow rate of 35 was used to provide a blend having a flow rate of about 31. The adhesion was satisfactory, but the heat seal strength of this coated paper was only 2.72 kg. per linear 2.5 cm. The composition extrusion coated at a coating speed of about 152 m./min. and had severe and unacceptable edge tear.

This example shows that decreasing the blend melt flow rate of the blend of this invention to about 31 does not provide a commercially desirable extrusion coating composition.

EXAMPLE 4

An extrusion coating composition was prepared according to Example 1 except that a crystalline polypropylene having a melt flow rate of 200 was used to provide a blend having a flow rate of about 110. The heat seal strength of this coated paper was 1.81 kg. pounds per linear 2.5 cm. The composition was extrusion coated at a coating speed of 91 m./min. and had excessive neck-in greater than 10.2 cm. per edge bead.

This example shows that increasing the blend melt flow rate to about 110 does not provide a commercially desirable extrusion coating composition.

EXAMPLE 5

An extrusion coating composition having a melt flow rate of 45 was prepared according to Example 1 except that the blend contained 75 percent crystalline polypropylene having a melt flow rate of 55, 19.8 percent polyethylene, 4.8 percent tackifier, and 0.4 percent stearyl erucamide. The composition was extrusion coated to kraft paper satisfactorily at a coating speed of about 300 m./min. and had adhesion of 350 grams per 2.5 cm. The heat sealability of extrusion coating was 4.54 kg. per linear 2.5 cm.

This example shows that a coating composition having a blend melt flow rate of 45 has good coatability and adhesion to the kraft paper substrate.

EXAMPLE 6

An extrusion coating composition having a melt flow rate of 60 was prepared according to Example 1 except that the blend contained 87.1 percent crystalline polypropylene having a melt flow rate of 90, 4.8 percent polyethylene, 7.3 percent tackifier, and 0.4 percent stearyl erucamide. The composition was extrusion coated to kraft paper satisfactorily at a coating speed of 244 m./min. and adhesion to the substrate was 400 grams per 2.5 cm. at a peel rate of 0.025 cm. per minute. The heat sealability of extrusion coating was 4.54 kg. per linear 2.5 cm.

This example shows that a coating composition having a blend melt flow rate of 60 has good coatability and good adhesion to the substrate.

EXAMPLE 7

An extrusion coating composition having a melt flow rate of 60 was prepared according to Example 1 except that the blend contained 79.3 percent crystalline polypropylene having a melt flow rate of 90, 20 percent polyethylene, 0.5 percent tackifier, and 0.2 percent stearyl erucamide. The composition was extrusion coated to kraft paper satisfactorily at a coating speed greater than 305 m./min. and adhesion of 200 grams per 2.5 cm. The heat sealability of extrusion coating was 4.54 kg. per linear 2.5 cm.

This example shows that a coating composition having a blend melt flow rate of 50 has good coatability and good adhesion to the substrate.

EXAMPLE 8

An extrusion coating composition having a melt flow rate of 50 was prepared according to Example 1 except that the blend contained 67.1 percent crystalline polypropylene having a melt flow rate of 80, 20 percent polyethylene, 12.5 percent tackifier, and 0.4 percent stearyl erucamide. The composition was extrusion coated to kraft paper satisfactorily at a coating speed of 167 m./min. and had adhesion of 500 grams per 2.5 cm. The heat sealability of extrusion coating was 4.54 pounds per linear 2.5 cm.

This example shows that a coating composition having a blend melt flow rate of 50 has good coatability and excellent adhesion to the substrate.

EXAMPLE 9

An extrusion coating composition having a melt flow rate of 60 was prepared according to Example 1 except that the blend contained 70 percent crystalline polypropylene having a melt flow rate of 100, 25 percent polyethylene, 4.6 percent tackifier, and 0.4 percent stearyl erucamide. The composition was extrusion coated to kraft paper satisfactorily at a coating speed of about 106 m./min. The coating had severe and commercially unacceptable edge tear caused by low neck-in.

This example shows that a blend which has a melt flow rate within the range defined by applicant's claims and which contains an amount of polyethylene greater than 20 percent is unacceptable for use in commercial coating operations.

EXAMPLE 10

An extrusion coating composition having a melt flow rate of 90 was prepared according to Example 1 except that the blend contained 92.1 percent crystalline polypropylene having a melt flow rate of 100, 2.5 percent polyethylene, 5 percent tackifier, and 0.4 percent stearyl erucamide. The composition was extrusion coated to kraft paper at a coating speed of 91 m./min. due to excessive neck-in and edge weave.

This example shows that a coating composition having a blend melt flow rate of 90 but which contains less than 5 percent polyethylene does not provide commercially acceptable extrusion coating formulations.

EXAMPLE 11

An extrusion coating composition having a melt flow rate of 50 was prepared according to Example 1 except that the blend contained 85 percent crystalline polypropylene having a melt flow rate of 52, 9.8 percent polyethylene, 4.8 percent tackifier, and 0.4 percent stearyl erucamide. The composition was extrusion coated to kraft paper satisfactorily at a coating speed of 305 m./min. and had adhesion of 340 grams per 2.5 cm. The heat sealability of extrusion coating was 4.54 kg. per linear 2.5 cm.

This example shows that a coating composition having a blend flow rate of 50 has good coatability and adhesion of the coating to the substrate.

The example was repeated using only 0.2 percent of the amide with the amounts of polypropylene and polyethylene increased by 0.1 percent and the tackifier was 4.8 percent. This provided a blend having a coating speed of about 122 m./min. and had adhesion of 340 grams per 2.5 cm.

The example was repeated using 0.8 percent amide with the amount of polypropylene and polyethylene each being decreased by 0.2 percent and the amount of tackifier was 4.8 percent. This provided a blend having a coating speed of greater than 396 m./min. and had adhesion of 340 grams per 2.5 cm.

EXAMPLE 12

An extrusion coating composition was prepared according to Example 1 except that crystalline propylene-/ethylene copolymer having a flow rate of 30 and an ethylene content of about 1.2 percent by weight was used. The composition was extrusion coated to unprimed aluminum foil satisfactorily. The heat seal strength of this coating was 9 kg per linear 2.5 cm. and at coatability speeds of greater than 305 m./min. provided coatings of less than 0.5 mils which had adhesion of about 400 grams per 2.5 cm.

This example shows that a propylene/ethylene copolymer can be used in place of polypropylene to provide acceptable coatings.

EXAMPLE 13

An extrusion coating composition was prepared according to Example 1 except that the stearyl erucamide was deleted from the coating formulation. The maximum coating speed obtained with this blend was about 85 m./min. due to the sticking of the coating onto the chill roll surface.

This example shows that when the fatty acid amine is deleted, the coatability or coating speed of the coating formulation is reduced by over 100 percent from that obtained by Example 1.

This example was repeated except that the coating temperature was lowered to 283° C. The maximum coating speed obtained at this temperature is about 61 m./min.

EXAMPLE 14

An extrusion coating composition was prepared according to Example 1 except that the amount of stearyl erucamide was increased to 0.8 percent and the amount of polypropylene and polyethylene was decreased by 0.2 percent and the hydrocarbon tackifier was 10 percent. The coating speed of this blend was about 305 m./min. and had adhesion of about 400 grams per 2.5 cm.

This example was repeated using only 0.2 weight percent of the amide with the amounts of polypropylene and polyethylene adjusted and the tackifier was 10 percent. This provided a blend having a coating speed of about 122 m./min.

Repeating this example using 0.4 percent amide with the amounts of polypropylene and polyethylene adjusted by an increase of 0.2 percent and the tackifier was 10 percent provided a blend having a coating speed of about 183 m./min.

Repeating this example using 1.0 percent amide increased the blend coating speed to greater than 400 m./min.

EXAMPLE 15

An extrusion coating composition was prepared according to Example 1 except that the amount of hydrocarbon tackifier was increased to 12.5 percent and the amount of polypropylene decreased to 77.5 percent by weight. The coating speed of this blend containing 0.4 percent stearylamide was only about 244 m./min. with an adhesion of about 450 grams per 2.5 cm. A blend prepared with the amount of stearyl erucamide at 0.2 percent by weight with similar reductions in the amount of polypropylene gave a coating speed of about 230 m./min.

This example shows that a blend containing 12.5 percent by weight tackifier has good coatability and good adhesion but reduced coatability.

EXAMPLE 16

An extrusion coating composition was prepared according to Example 1 except that the amount of hydrocarbon tackifier was increased to 15 percent and the amount of polypropylene decreased to 75 percent by weight. The coating speed of this blend containing 0.4 percent stearylamide was only about 140 m./min. A blend prepared with the amount of stearyl erucamide at 0.2 percent by weight with a similar reduction in the amount of polypropylene gave a coating speed of about 61 m./min.

This example shows that a blend containing 15 percent by weight tackifier has a substantially reduced coatability. Further, without the fatty acid amide the blend containing this amount of tackifier has poor coatability.

The invention has been described in detail with particular reference to preferred embodiments thereof, but it will be understood that variations and modifications can be effected within the spirit and scope thereof.

I claim:

1. An extrusion coating composition having a flow rate of 40 to 100 dg/min. at 230° C. which provides coatings of less than 1 mil which have heat seal strengths of at least 4.5 kg. per linear 2.5 cm. at coating speeds greater than 122 m./min. comprising a blend of (1) about 90 to 65 percent, by weight, of at least one crystalline polypropylene or propylene containing copolymer containing at least 80 weight percent propylene and having a melt flow rate of 30 to 140 dg/min. at 230° C., and (2) about 5 to 20 percent, by weight, of at least one polyethylene having a density of 0.916 to 0.925, a melt index at 190° C. of 2 to 7, and a swell ratio of about 1.5 to 2.2, (3) about 0.5 to 12.5 percent, by weight, of a hydrocarbon tackifying resin having a Ring and Ball softening point of about 75° C. to about 150° C., and (4) about 0.2 to 1.0 percent, by weight, fatty acid amide having 16 to 40 carbon atoms.

2. An extrusion coating composition according to claim 1 wherein said crystalline polypropylene or propylene containing copolymer is crystalline polypropylene.

3. An extrusion coating composition according to claim 2 wherein said crystalline polypropylene has a melt flow rate of 50 to 70 at 230° C.

4. An extrusion coating composition according to claim 3 wherein said low density polyethylene has a melt index of 3.5 dg/min. at 190° C., a density of 0.917 g/cc, and a swell ratio of 1.70.

5. An extrusion coating composition according to claim 4 wherein said tackifying resin is a hydrocarbon tackifying resin having a Ring and Ball softening point of about 130° C.

6. An extrusion coating composition according to claim 4 wherein said tackifying resin is pentaerythritol ester of tall oil rosin having a Ring and Ball softening point of about 100° C. and an acid number of about 11.

7. An extrusion coating composition according to claim 6 wherein said fatty acid amide is stearyl erucamide.

8. An extrusion coating composition having a flow rate of 45 to 60 dg/min. at 230° C. which provides coatings of less than 1 mil which have heat seal strengths of at least 4.5 kg. per linear 2.5 cm. at coating speeds greater than 122 m./min. comprising a blend of (1) about 90 to 80 percent, by weight, of at least one crystalline polypropylene or propylene containing copolymer containing at least 80 weight percent propylene and having a melt flow rate of 30 to 140 dg/min. at 230° C., and (2) about 5 to 10 percent, by weight, of at least one polyethylene having a density of 0.916 to 0.925, a melt index at 190° C. of 2 to 7, and a swell ratio of about 1.5 to 2.2, (3) about 2 to 10 percent, by weight, of a tackifying resin having a Ring and Ball softening point of about 75° C. to about 150° C., and (4) about 0.3 to 0.5 percent, by weight, fatty acid amide having 16 to 40 carbon atoms.

9. An extrusion coating composition according to claim 8 wherein said crystalline polypropylene or propylene containing copolymer is crystalline polypropylene.

10. An extrusion coating composition according to claim 9 wherein said crystalline polypropylene has a melt flow rate of 50 to 70 at 230° C.

11. An extrusion coating composition according to claim 10 wherein said low density polyethylene has a melt index of 3.5 dg/min. at 190° C., a density of 0.917 g/cc, and a swell ratio of 1.70.

12. An extrusion coating composition according to claim 11 wherein said tackifying resin is a hydrocarbon tackifying resin having a Ring and Ball softening point of about 130° C.

13. An extrusion coating composition according to claim 11 wherein said tackifying resin is pentaerythritol ester of tall oil rosin having a Ring and Ball softening point of about 100° C. and an acid number of about 11.

14. An extrusion coating composition according to claim 13 wherein said fatty acid amide is stearyl erucamide.

15. An extrusion coating composition having a flow rate of 45 to 55 dg/min. at 230° C. which provides coatings of less than 1 mil which have heat seal strengths of at least 4.5 kg. per linear 2.5 cm. at coating speeds greater than 122 m./min. comprising a blend of (1) about 90 to 80 percent, by weight, of at least one crystalline polypropylene or propylene containing copolymer containing at least 80 weight percent propylene and having a melt flow rate of 30 to 140 dg/min. at 230° C., and (2) about 5 to 10 percent, by weight, of at least one polyethylene having a density of 0.916 to 0.925, a melt index at 190° C. of 2 to 7, and a swell ratio of about 1.5 to 2.2, (3) about 2 to 10 percent, by weight, of a tackifying resin having a Ring and Ball softening point of about 75° C. to about 150° C., and (4) about 0.3 to 0.5 percent, by weight, fatty acid amide having 16 to 40 carbon atoms.

16. An extrusion coating composition according to claim 15 wherein said crystalline polypropylene or propylene containing copolymer is crystalline polypropylene.

17. An extrusion coating composition according to claim 16 wherein said crystalline polypropylene has a melt flow rate of 50 to 70 at 230° C.

18. An extrusion coating composition according to claim 17 wherein said low density polyethylene has a melt index of 3.5 dg/min. at 190° C., a density of 0.917 g/cc, and a swell ratio of 1.70.

19. An extrusion coating composition according to claim 18 wherein said tackifying resin is a hydrocarbon tackifying resin having a Ring and Ball softening point of about 130° C.

20. An extrusion coating composition according to claim 18 wherein said tackifying resin is pentaerythritol ester of tall oil rosin having a Ring and Ball softening point of about 100° C. and an acid number of about 11.

21. An extrusion coating composition according to claim 20 wherein said fatty acid amide is stearyl erucamide.

* * * * *